March 30, 1926.

W. M. WHEILDON

DISPENSING MATERIAL FROM ROLLS

Filed Feb. 21, 1925    2 Sheets-Sheet 1

1,578,874

Inventor:
William M. Wheildon,
by Emery, Booth, Janney & Varney
Attys.

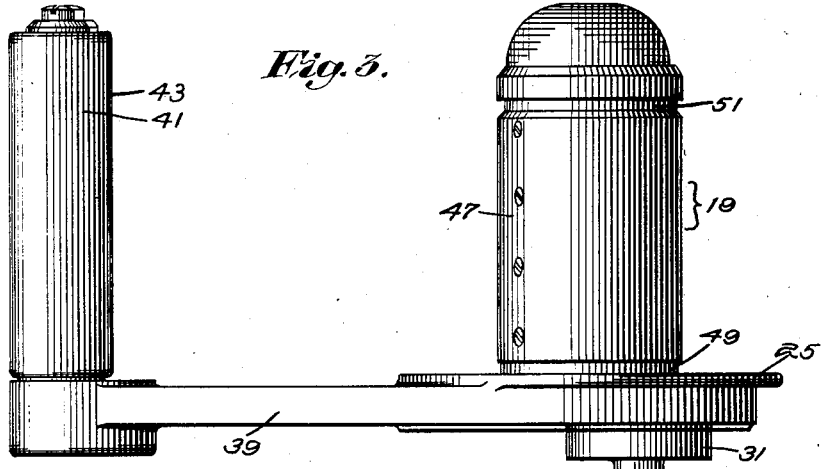
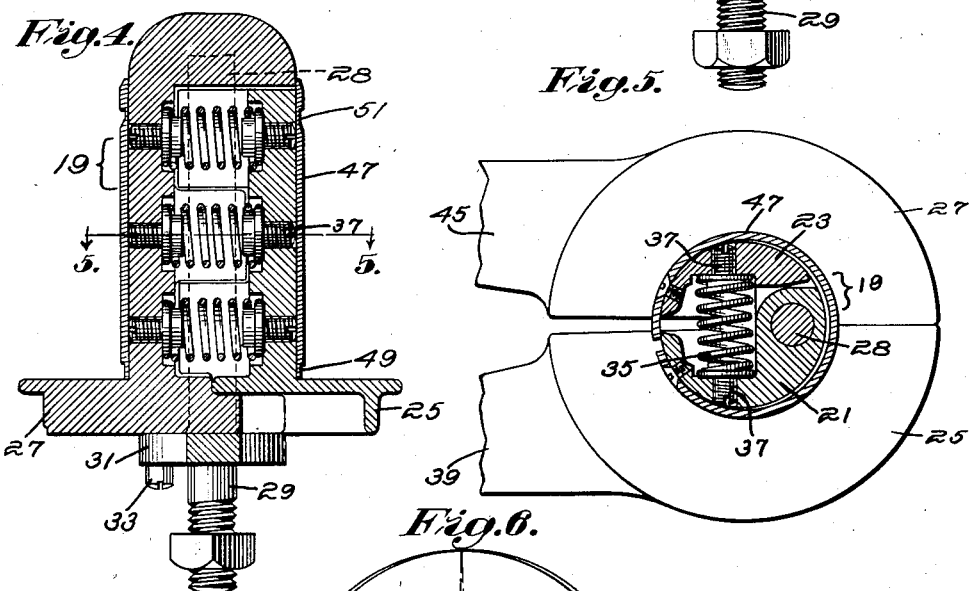
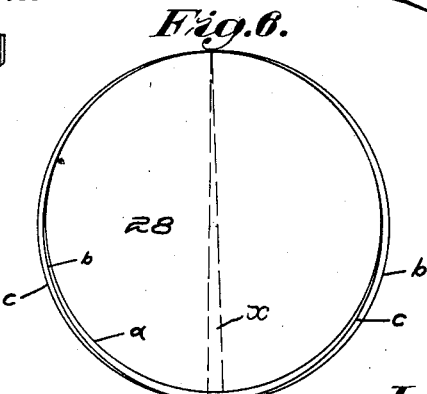

Patented Mar. 30, 1926.

1,578,874

UNITED STATES PATENT OFFICE.

WILLIAM M. WHEILDON, OF FRAMINGHAM, MASSACHUSETTS, ASSIGNOR TO EDWARD H. ANGIER, OF FRAMINGHAM, MASSACHUSETTS.

DISPENSING MATERIAL FROM ROLLS.

Application filed February 21, 1925. Serial No. 10,854.

*To all whom it may concern:*

Be it known that I, WILLIAM M. WHEILDON, a citizen of the United States, and a resident of Framingham, county of Middlesex, and State of Massachusetts, have invented an Improvement in Dispensing Materials from Rolls, of which the following description, in connection with the accompanying drawings, is a specification, like characters on the drawings representing like parts.

This invention relates to mechanism for holding a roll of material which is drawn from the roll for use. One primary object of the invention is to provide such a mechanism wherein a controllable resistance to the drawing off of the material is provided whereby the same may be properly tensioned. The invention finds a particular application in connection with wrapping machines and in particular those wrapping machines which are used to apply a helical wrapping of strip material to an annular article and for convenience in the appended description I will describe as an example of my invention a mechanism particularly designed for use on a machine for wrapping tires or other ring-like bodies.

My invention will be well understood by reference to the following description taken in connection with the accompanying drawings, wherein:

Fig. 3 is a side elevation thereof as seen from the left of Fig. 1;

Fig. 4 is a section on the line 4—4 of Fig. 2;

Fig. 5 is a section on the line 5—5 of Fig. 4; and

Fig. 6 is an enlarged diagram illustrating certain features of construction which may be embodied in the tension mechanism.

Figure 1:
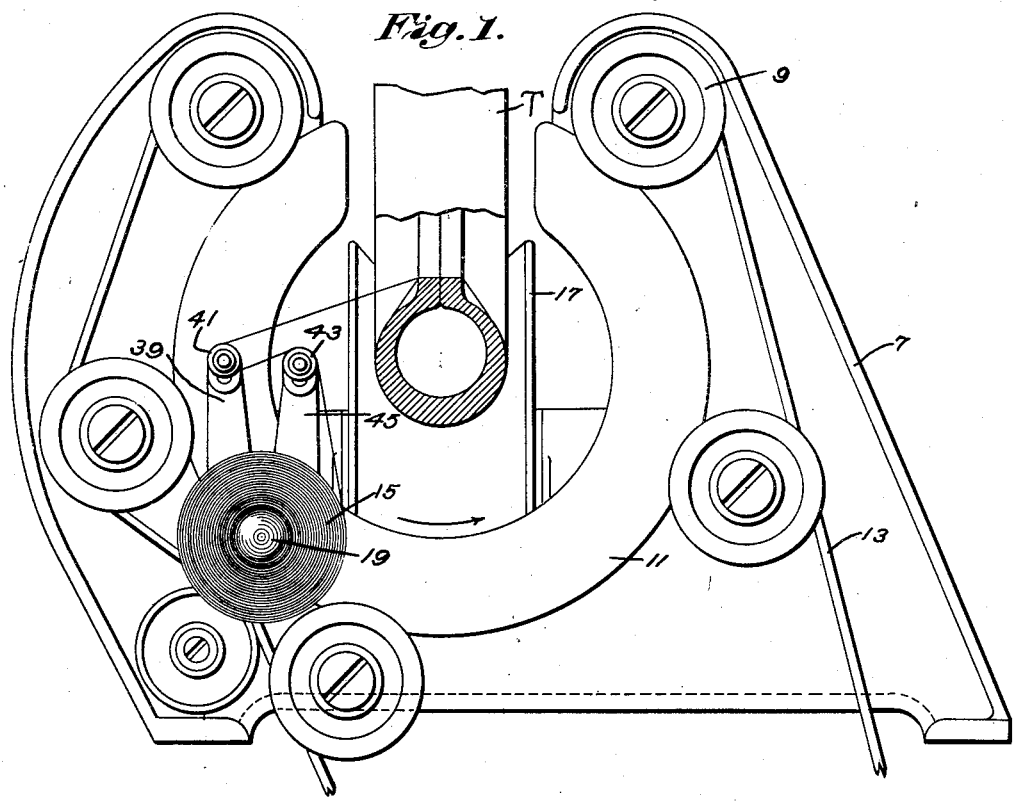
Fig. 1 is an elevation of the shuttle and some adjacent parts of a tire wrapping machine of known type showing a tension mechanism embodying my invention mounted on the shuttle.
Figure 2:
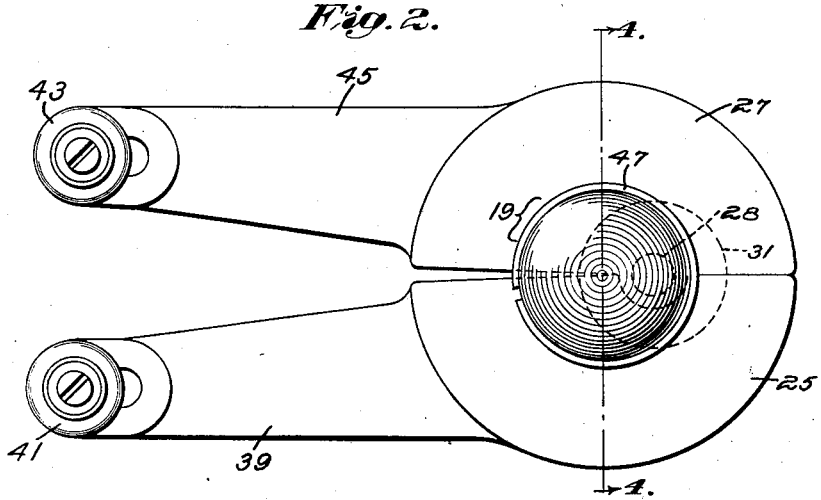
Fig. 2 is an end elevation on a larger scale of the tension mechanism attached.

Referring to Fig. 1 of the drawings, I have there illustrated a portion of a well known type of tire wrapping machine embodying a suitable frame 7 on which is supported by rollers 9 a nearly annular shuttle 11. This shuttle is engaged exteriorly by the bight of a driving belt 13 and is revolved about its own axis carrying with it the roll 15 of wrapping strip. A tire T is supported by rolls 17 (only one of which is shown in Fig. 1) so that a portion passes through the eye or opening of the shuttle 11 and it is advanced by the rolls 17. Paper from the roll 15 is drawn off by the rotation of the shuttle and wrapped around the cross section of the tire and the feeding movement of the tire causes the strip to be applied as a helical wrapping.

In wrapping an article the wrapping material should be drawn snugly about the same and in particular when wrapping an annular article to form the package described in Patent No. 1,282,167, dated Oct. 22, 1918, to Edward H. Angier, a very considerable tension should be applied to the wrapping strip partially to expand the resilient gatherings of the wrapping material and form a wrapping closely conforming to the tire or other article. It will be apparent however, that when the roll of material is large, the pull of the strip unwinding therefrom is exerted through a comparatively long crank arm corresponding to the radius of the full sized roll. Consequently a resistance of the roll to rotation and unwinding which would adequately tension the material when the roll is of full size might be unduly large after a considerable amount of the strip had been unwound. The embodiment of my invention which I shall presently describe and which is shown in Fig. 1 as providing for the mounting of the roll 15 on the shuttle 11 provides for controlling the rotation of the roll to compensate for the variation in rotative effect of the unwinding pull due to the change in diameter of the roll by providing a variable resistance to unwinding so that the tension on the wrapping strip may be, if desired, substantially constant.

The embodiment of my invention herein illustrated is a device organized as a unit and which may be applied as such, for example, to shuttles 11 of existing wrapping machines although, as will be apparent when the description is concluded, such a unitary organization of the parts is not necessary although convenient.

The device herein shown as an example of my invention provides a spindle 19 which may project in overhung relation from the face of the shuttle 11 to receive a roll of wrapping strip mounted on the usual core, which roll may be placed thereon by movement of approach axial to the spindle 19 over the unobstructed outer end thereof. The spindle 19 is adapted to serve as a center about which the roll of material revolves as the strip unwinds. It is herein capable of expansion and contraction to provide a variable effective diameter so that it may bear with a variable pressure upon the inner cylindrical surface of the roll to brake the same and provide a variable resistance to rotation of the roll about the spindle. For this purpose the spindle may be split along one side to provide two relatively flexing halves, which by their flexing movement cause the spindle as a whole to dilate and constrict. In the example of the invention shown (see particularly Fig. 5) the spindle 19 may be made of two separate parts embodying substantially semi-cylindrical shells 21 and 23 which may project respectively from flange-like base portions 25 and 27. The two shells 21 and 23 may be provided with hinge knuckles connected by a pintle 28 which may be formed as a portion of a stud 29 (see Fig. 4) by means of which the tension device as a whole may be mounted on the shuttle. Herein the stud 29 is provided with a flange portion 31 through which a screw or stud 33 eccentric to the stud 29 may extend into the base portion 27 which carries shell 23 and the projecting head of this stud 33 may also serve as a key entering the shuttle to anchor the base part 27 non-rotatably thereon. Part 27 with its projecting shell 23 then forms a fixed element relative to which the shell 21 mounted on base portion 25 is adapted to flex or rock about the pivot provided by pintle 28, the two portions 21 and 23 presenting in normal position, as shown in Fig. 5, a split or clearance between their opposed edges substantially diametral to the pintle 28.

The relatively movable parts of the spindle have a certain normal position from which they may be brought to vary the action of the spindle as a brake for the roll and preferably movement from the normal position is effected against a resilient resistance. Herein contraction or constriction of the spindle is opposed by means of springs 35 housed within the same and tending to hold apart the sections 21 and 23 of the spindle in the position shown in Fig. 5. Suitable means may be provided, if desired, for adjusting the tension of these springs and herein they are shown as seated on the head-like portions of screw elements 37 threaded into the sides of the parts 21 and 23. The threaded openings in which the elements 37 are seated may extend through the outer faces of the elements 21 and 23 so as to be accessible through the exterior thereof for adjusting movement and I have herein shown them as provided with notches to permit them to be engaged by a screwdriver.

Suitable means are provided for automatically adjusting the effective diameter of the spindle in accordance with the variation in the rotative effect of an unwinding pull on the material of the roll which is mounted thereon, which variation is due to change in the diameter of the roll. In the embodiment of the invention illustrated this is effected through the tension of the run of the material extending between the roll and the article to be wrapped and I have shown the relatively movable base portion 25 which carries the movable portion 21 of the spindle as provided with an arm 39 extending on one side of the split defined by the two parts of the spindle, on the end of which arm is mounted an overhanging guide-roll 41 over which the material is adapted to be led. Cooperating with roll 41 is a similar but relatively fixed guide-roll 43 and in the illustrated embodiment of the invention the roll 43 is mounted on the end of an arm 45 extending from base portion 27, thus providing for the organization of the tension mechanism as a unit.

The mechanism just described and illustrated in detail in Figs. 2 to 5 inclusive may be mounted on the shuttle 11 of the wrapping machine in the manner illustrated in Fig. 1 with the fixed arm 45 on the inner side and at such an angle as to permit the material to be led from the roll thereof on the spindle 19, over guide-roll 43, thence over the movable guide-roll 41 on the movable arm 39 and in a loop back to the tire T which is being wrapped, either directly as in the case illustrated or through such auxiliary mechanism as it may be desired to utilize. The orientation of the tension mechanism should be such as to provide as nearly as practicable a pull of the wrapping material substantially perpendicular to the axis of arm 39 and the arrangement should, of course, be such that in whatever position the shuttle may be during the wrapping operation the run of paper on the further side of guide-roll 41, that is, between guide-roll 41 and the tire, shall not foul roll 43.

The operation of the tension mechanism will be plain from an inspection of Fig. 1.

Either by providing initially springs 35 of suitable strength or by adjustably tensioning the springs a resistance to contraction of the spindle through the pull of the material on arm 39 is provided to produce a desired normal braking action on the core of the roll when the latter is of full size. If now during the wrapping operation the resistance to unwinding increases and the tension on the wrapping material increases unduly, the arm 39 will be swung further to the right viewing Fig. 1 and this will cause the spindle 19 to contract further, releasing the braking pressure and consequently permitting the material to unwind more readily from the roll and relaxing the tension on the strip of material. This action takes place automatically throughout the wrapping operation and provides for a substantially uniform tension on the wrapping strip whatever the size of the roll 15.

Particularly in those instances like that illustrated wherein the spindle is made of two parts connected together by mechanical means I may conveniently provide an outer split sleeve 47 of thin flexible metal which may be assembled on the parts 21 and 23 as shown in Fig. 5 with the split out of line with that between those parts. Such a sleeve covers the joint at the hinge and while in the embodiment of the invention shown the springing thereof is not relied upon for providing any of the braking pressure, the constriction and dilation thereof will more nearly approximate a series of circles of different sizes fitting more or less tightly the core of the roll in accordance with the braking effect desired than do the two rigid hinged elements 21 and 23.

As best shown in Fig. 4, the sleeve 47 may be provided with a groove 49 at the inner end and a groove 51 adjacent its outer end at locations corresponding to the end faces of the roll which is to be applied to the spindle. This arrangement has several advantages which will be more readily appreciated if it is recalled that the cores of rolls of paper, commonly constructed of cardboard, have a burr of roughness at their ends where they are cut apart in the manufacture thereof. The grooves 49 and 51 provide for receiving these burrs and define between them an elevated portion which may make contact over a wide area of the inner circumference of the core between the burrs and serve as an effective brake shoe. An important advantage in the case of an overhung roll as herein illustrated is that, presumably because of the engagement of the burred portions of the core with the grooves 49 and 51 which, as will be noted from Fig. 4, have exterior shoulders, any tendency of the roll to slip off the spindle is effectually prevented.

From one point of view in the embodiment of the invention shown the addition of the sleeve 47 is in the nature of a refinement. From another point of view it might be considered the effective braking surface which is operated by the two members 21 and 23 operated in the manner of toggle links.

As shown in Fig. 1, the parts of the mechanism may be so organized that the two overhanging guide-rolls 41 and 43 are in quite close proximity one to another so that they may be gripped in one hand and drawn together by a closing action of the fingers to contract the spindle 19. This provides for withdrawing the cores of used rolls and for placing new rolls on the spindle in a very easy manner.

When, as in the embodiment of the invention shown, the spindle is constructed of two pieces hinged together, means may be provided whereby the movable piece, as 21, may rock upon a bearing in the relatively fixed piece 23 consisting substantially of a line and acting similarly to a knife edge bearing. In Fig. 6 I have illustrated diagrammatically one method whereby this desirable result may be substantially realized. I have there illustrated on an enlarged scale a circle $a$ representing a pin such as 28, the diameter of which is .005 of an inch less than $\frac{7}{16}$ and at $b$ and $c$ I have illustrated in different extreme positions the diameter of an opening in the hinge knuckles of the movable piece 21, which opening is $\frac{7}{16}$ of an inch in diameter. The piece 21 may rock through an angle $x$ which in practice will be about $2\frac{1}{2}°$ and it will be apparent from inspection of the figure that the movable piece 23 will have substantially a line bearing on the top of the pin represented by the circle $a$.

I have described in detail the particular mechanical embodiment of my invention shown in the accompanying drawings. Obviously this is merely illustrative and the construction may be embodied in many other forms without departing from the spirit of the invention.

What I claim as new and desire to secure by Letters Patent I shall express in the following claims:

1. A tension mechanism for material in rolls comprising a split cylinder adapted to serve as a spindle for the roll and tending when constricted to expand again to grip the roll and means for constricting the same comprising an arm acting on a portion of the perimeter and having a bearing for the material leading from the roll.

2. Tension mechanism for material in rolls comprising a split cylinder adapted to serve as a spindle for the roll, an arm carried by the cylinder at one side of the split, a guide on said arm and another relatively fixed guide over which guides the material may be trained whereby the action thereof on said arm may deform the cylinder.

3. Tension mechanism comprising two hinged elements adapted to serve as a spindle for a roll of material and frictionally to engage the same, resilient means interposed between said elements, an arm carried by one of the elements having a guide over which the material may pass to operate by its tension the said arm to move said one element against the action of said resilient means.

4. Means for controlling the rotation of a roll of material comprising a spindle on which the roll turns and having a portion of its exterior surface movable to bear with variable pressure on the inner circumference of the roll and means governed by the tension of the material as drawn from the roll for governing the movement.

5. Means for controlling the rotation of a roll of material comprising a spindle on which the roll turns and having a portion of its exterior surface movable to bear with variable pressure on the inner circumference of the roll and means acting to exert a force variable with the diameter of the roll for controlling such movement.

6. Tension mechanism for material in rolls comprising two substantially semi-cylindrical elements connected along one side for relative flexing movement and providing a resilient resistance to such movement and an arm carried by one element having a bearing for the material led from a roll thereof which is mounted on said elements as a spindle whereby the tension of such material may act through said arm on said element to flex the same against said resistance.

7. Tension mechanism for material in rolls comprising two elements each having an arm provided with a terminal guide-roll and a substantially semi-cyindrical shell, a hinge joint connecting the shells to provide a split spindle and spring means acting on the shells to control dilation and constriction of the spindle.

8. Tension mechanism for material in rolls comprising a spindle split along one side and adapted to flex about a line substantially diametral to the split and means automatically controlling the flexure as the size of the roll diminishes with consequent diminution of the rotative effect of an unwinding pull.

9. Tension mechanism for material in rolls comprising a hollow spindle split along one side and adapted to flex about a line substantially diametral to the split, a spring between the sides of the spindle and means for automatically controlling the flexing movement to provide a variable resistance.

10. Tension mechanism for material in rolls comprising a hollow spindle split along one side and adapted to flex about a line substantially diametral to the split, a spring between the sides of the spindle, means accessible through the side of the spindle for adjusting the tension of the spring and means for automatically controlling the flexing movement to provide a variable resistance.

11. Means for controlling the rotation of a roll of material comprising a braking surface arranged to contact with the inner cylindrical surface of the roll and a movable element over which the material leads effective by its movement to vary the pressure of said braking surface on said cylindrical surface.

12. A support on which a roll may revolve comprising a non-rotating overhung spindle adapted to be collapsed in effective circumference to permit the roll to be placed thereon and to be expanded to grip the inner circumference of the roll, the exterior surface of the spindle being grooved at a location corresponding to the outer end face of the roll.

13. Tension mechanism for material in rolls comprising a pair of substantially semi-cylindrical parts providing a spindle, hinge knuckles thereon, pivot means arranged in said knuckles to provide substantially a line bearing for rocking of one part on the other, spring means to control rocking of the parts and an arm carried by one part carrying an element for contact with the material to be moved by said material to cause relative rocking of the parts.

14. Tension mechanism for material in rolls comprising a pair of substantially semi-cylindrical parts providing a spindle, means connecting said parts for relative rocking movement about substantially a line bearing, spring means to control rocking of the parts and an arm carried by one part carrying an element for contact with the material to be moved by said material to cause relative rocking of the parts.

15. Tension mechanism for material in rolls comprising an expansible spindle adapted frictionally to engage the interior of the roll, means for controlling the expansion comprising a movable arm having a guide-roll, and a relatively fixed guide-roll, the two guide-rolls being located in such proximity as to permit the grasping of both with the hand to swing the arm and relax the engagement of the spindle with the roll.

16. Tension mechanism for material in rolls comprising a spindle on which the roll revolves having an exterior portion adjustably movable to bear frictionally on the interior of the roll, the exterior of the spindle being relieved at locations corresponding to the end faces of the roll.

17. Tension mechanism for material in rolls comprising an expansible and contractible spindle on which the roll revolves consisting of a plurality of relatively movable parts, means controlling the movement of said parts and a flexible split sleeve enclosing the parts and adapted to engage the interior of the roll, said sleeve being relieved at locations corresponding to the end faces of the roll.

18. Tension mechanism for material in rolls comprising a roll receiving spindle having an exterior split sleeve to be received in the central opening of the roll, means to dilate and constrict the same therein comprising relatively movable parts received within the sleeve and means for controlling their relative movement variably with the variation of the effective pull of the unwinding material.

In testimony whereof, I have signed my name to this specification.

WILLIAM M. WHEILDON.